(12) United States Patent
Kim

(10) Patent No.: US 12,058,616 B2
(45) Date of Patent: Aug. 6, 2024

(54) ELECTRONIC DEVICE FOR CONTROLLING COMMUNICATION CIRCUIT SUPPORTING C-DRX AND METHOD FOR THE SAME

(71) Applicant: Samsung Electronics Co., Ltd., Suwon-si (KR)

(72) Inventor: Hyeonsoo Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 360 days.

(21) Appl. No.: 17/652,449

(22) Filed: Feb. 24, 2022

(65) Prior Publication Data

US 2022/0330148 A1 Oct. 13, 2022

Related U.S. Application Data

(63) Continuation of application No. PCT/KR2022/000848, filed on Jan. 17, 2022.

(30) Foreign Application Priority Data

Apr. 8, 2021 (KR) ........................ 10-2021-0045726

(51) Int. Cl.
*H04W 52/02* (2009.01)
*H04W 76/20* (2018.01)

(52) U.S. Cl.
CPC ... *H04W 52/0216* (2013.01); *H04W 52/0235* (2013.01); *H04W 76/20* (2018.02)

(58) Field of Classification Search
None
See application file for complete search history.

(56) References Cited

U.S. PATENT DOCUMENTS 10,271,374 B2   4/2019   Giguet et al.
11,013,055 B2   5/2021   Nord et al.
(Continued)

FOREIGN PATENT DOCUMENTS

KR   10-2018-0093214 A   8/2018
KR   10-2019-0060767 A   6/2019
(Continued)

OTHER PUBLICATIONS

International Search Report of the International Searching Authority dated Apr. 20, 2022, in connection with International Application No. PCT/KR2022/000848, 11 pages.
(Continued)

*Primary Examiner* — Alex Skripnikov

(57) ABSTRACT

An electronic device and a method for operating the electronic device. The electronic device includes: a communication processor configured to support a C-DRX; and a communication circuit configured to switch a first on-duration period to a sleep duration according to expiration of a predetermined time corresponding to an inactivity timer, wherein the communication processor is configured to determine whether to change a length of the sleep duration of the C-DRX, based on a state of the electronic device, control the communication circuit to transmit UE assistance information for changing the length of the sleep duration of the C-DRX, based on the determination, to a network, and control an operation related to the C-DRX of the communication circuit, based on the inactivity timer having a changed predetermined time included in an RRC reconfiguration message received according to an RRC connection with the network. Various other embodiments are possible.

15 Claims, 8 Drawing Sheets

(56) References Cited

U.S. PATENT DOCUMENTS

| | | | |
|---|---|---|---|
| 11,172,533 B2 | 11/2021 | Kong et al. | |
| 11,258,570 B2 | 2/2022 | Li et al. | |
| 2015/0133061 A1* | 5/2015 | Wu ................... | H04W 36/0088 |
| | | | 455/67.11 |
| 2016/0295636 A1* | 10/2016 | Yang ................ | H04W 52/0264 |
| 2017/0118708 A1 | 4/2017 | Alon et al. | |
| 2018/0234920 A1 | 8/2018 | Bae | |
| 2020/0186991 A1 | 6/2020 | He et al. | |
| 2022/0015189 A1 | 1/2022 | Zheng et al. | |
| 2022/0191787 A1* | 6/2022 | Shahid ............. | H04W 52/0212 |
| 2022/0256643 A1 | 8/2022 | Reial et al. | |
| 2023/0269821 A1* | 8/2023 | Ranjan ................ | H04W 76/28 |
| | | | 370/329 |

FOREIGN PATENT DOCUMENTS

| | | |
|---|---|---|
| KR | 10-2380492 B1 | 3/2022 |
| KR | 10-2491412 B1 | 1/2023 |
| WO | 2020192739 A1 | 10/2020 |
| WO | 2020254475 A1 | 12/2020 |

OTHER PUBLICATIONS

3GPP TS 38.331 V16.6.0 (Sep. 2021); Technical Specification; 3rd Generation Partnership Project; Technical Specification Group Radio Access Network; NR; Radio Resource Control (RRC) protocol specification (Release 16), 961 pages.

\* cited by examiner

ELECTRONIC DEVICE FOR CONTROLLING COMMUNICATION CIRCUIT SUPPORTING C-DRX AND METHOD FOR THE SAME

CROSS-REFERENCE TO RELATED APPLICATIONS

This application is a bypass continuation of International Application No. PCT/KR2022/000848, filed Jan. 17, 2022, which claims priority to Korean Patent Application No. 10-2021-0045726, filed Apr. 8, 2021, the disclosures of which are herein incorporated by reference in their entirety.

BACKGROUND

1. Field

The disclosure relates to an electronic device and a method for operating an electronic device, and a technology for controlling a communication circuit supporting connected mode discontinuous reception (C-DRX).

2. Description of Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, the 5G communication system considers implementation in an mmWave band (for example, a band higher than or equal to 6 GHz) as well as a band (a band equal to or lower than 6 GHz) used by LTE. In the 5G communication system, technologies such as beamforming, massive MIMO, full dimensional MIMO (FD-MIMO), array antenna, analog beam-forming, and large scale antenna are being discussed.

The electronic device may support connected mode discontinuous reception (C-DRX). The C-DRX may be a mode for performing non-continuous reception in the state in which the electronic device maintains the connection to the network. The electronic device may non-continuously monitor a downlink channel and receive a packet (or data) through the downlink channel.

The electronic device supporting the C-DRX may monitor a downlink channel in an on-duration period in which a packet can be received from the network and does not monitor a downlink channel in a sleep duration in which reception of a packet from the network is not possible, and thus may receive no packet from the network.

The electronic device may control a communication circuit to activate components included in the communication circuit for performing a packet reception function during the on-duration period and control the communication circuit to deactivate components included in the communication circuit for performing a packet reception function during the sleep duration. The electronic device may deactivate the packet reception function in the sleep duration, thereby reducing power consumption due to packet reception by the electronic device.

SUMMARY

The electronic device cannot receive a packet in the sleep duration and thus can receive a packet in a new on-duration period after the sleep duration. Since the packet cannot be received in the sleep duration, a delay time for packet reception may increase.

The network may configure a C-DRX parameter without consideration of a state of the electronic device and thus cannot configure a parameter for performing C-DRX suitable for the state of the electronic device, and a delay time for packet reception of the electronic device may increase.

An electronic device according to various embodiments of the disclosure includes: a communication processor configured to support a connected mode discontinuous reception (C-DRX); and a communication circuit configured to switch a first on-duration period to a sleep duration according to expiration of a predetermined time corresponding to an inactivity timer, wherein the communication processor is configured to determine whether to change a length of the sleep duration of the C-DRX, based on a state of the electronic device, control the communication circuit to transmit UE assistance information for changing the length of the sleep duration of the C-DRX, based on the determination, to a network, and control an operation related to the C-DRX of the communication circuit, based on the inactivity timer having a changed predetermined time included in an RRC reconfiguration message received according to an RRC connection with the network.

A method of operating an electronic device according to various embodiments of the disclosure includes: determining whether to change a length of the sleep duration of the C-DRX, based on a state of the electronic device; transmitting UE assistance information for changing the length of the sleep duration of the C-DRX, based on the determination, to a network, and controlling a communication circuit configured to perform an operation related to the C-DRX, based on the inactivity timer having a changed predetermined time included in an RRC reconfiguration message received according to an RRC connection with the network.

An electronic device and a method of operating the electronic device according to various embodiments of the disclosure can control a length of a sleep duration of C-DRX on the basis of state information of the electronic device. The electronic device can transmit UE assistance information for reducing the length of the sleep duration according to the generation of a packet reception delay due to the sleep duration and increase a configured value of an inactivity timer of the C-DRX, thereby receiving a packet before switching to the sleep duration. Accordingly, the electronic device can reduce the packet reception delay due to the sleep duration.

The electronic device and the method of operating the electronic device according to various embodiments of the disclosure can control the length of the sleep duration of the C-DRX on the basis of state information of the electronic device. The electronic device can transmit UE assistance information for reducing the length of the sleep duration to the network according to execution of an operation mode (for example, high-performance mode) requiring a low delay time and a predetermined application requiring a low delay time and increase a configured value of the inactivity timer of the C-DRX, thereby receiving a packet before switching to the sleep duration. Accordingly, the electronic device can reduce the delay time due to the sleep duration.

DETAILED DESCRIPTION

Figure 1:
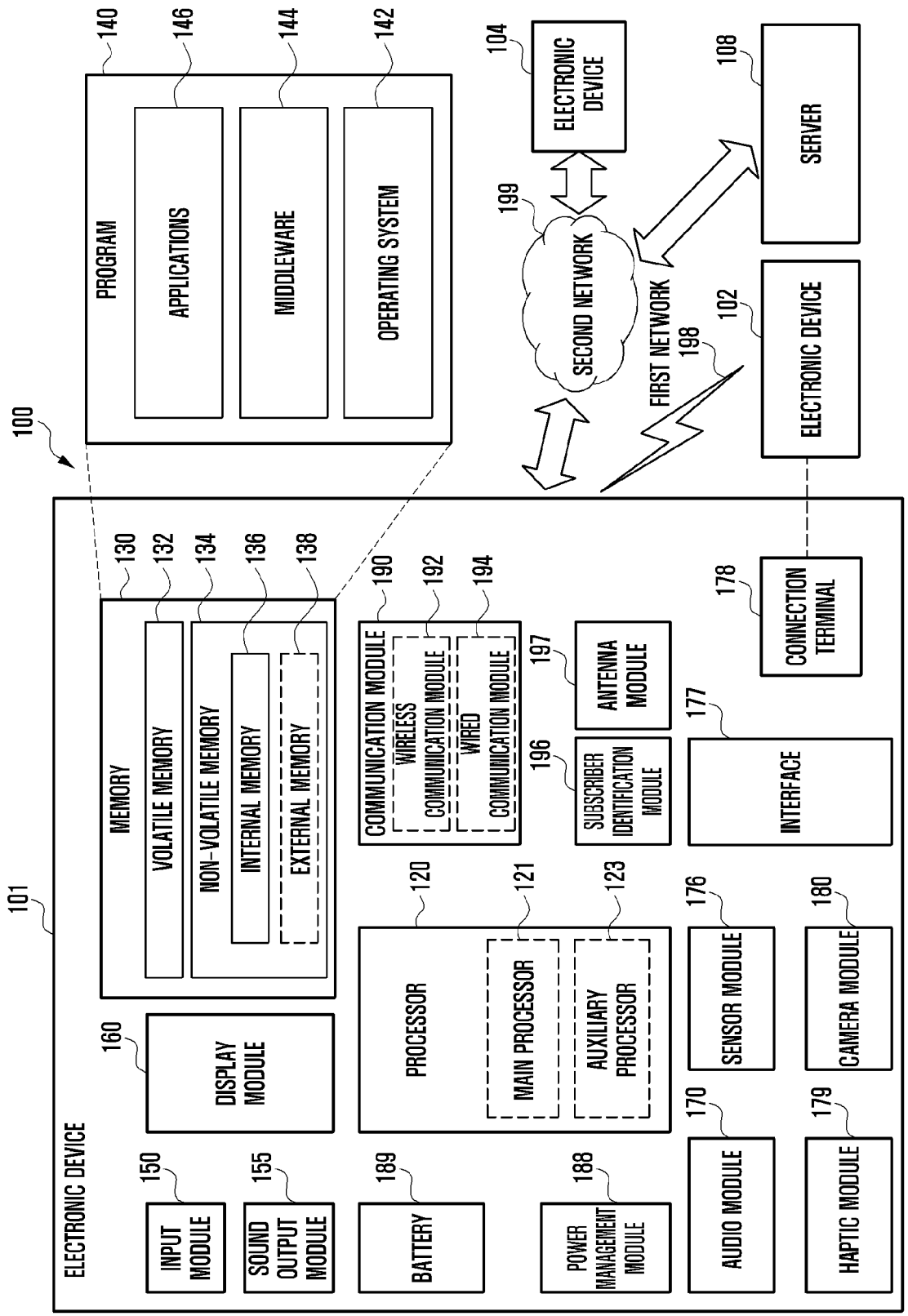
FIG. 1 is a block diagram of an electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the 11 connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). 11

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 may perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
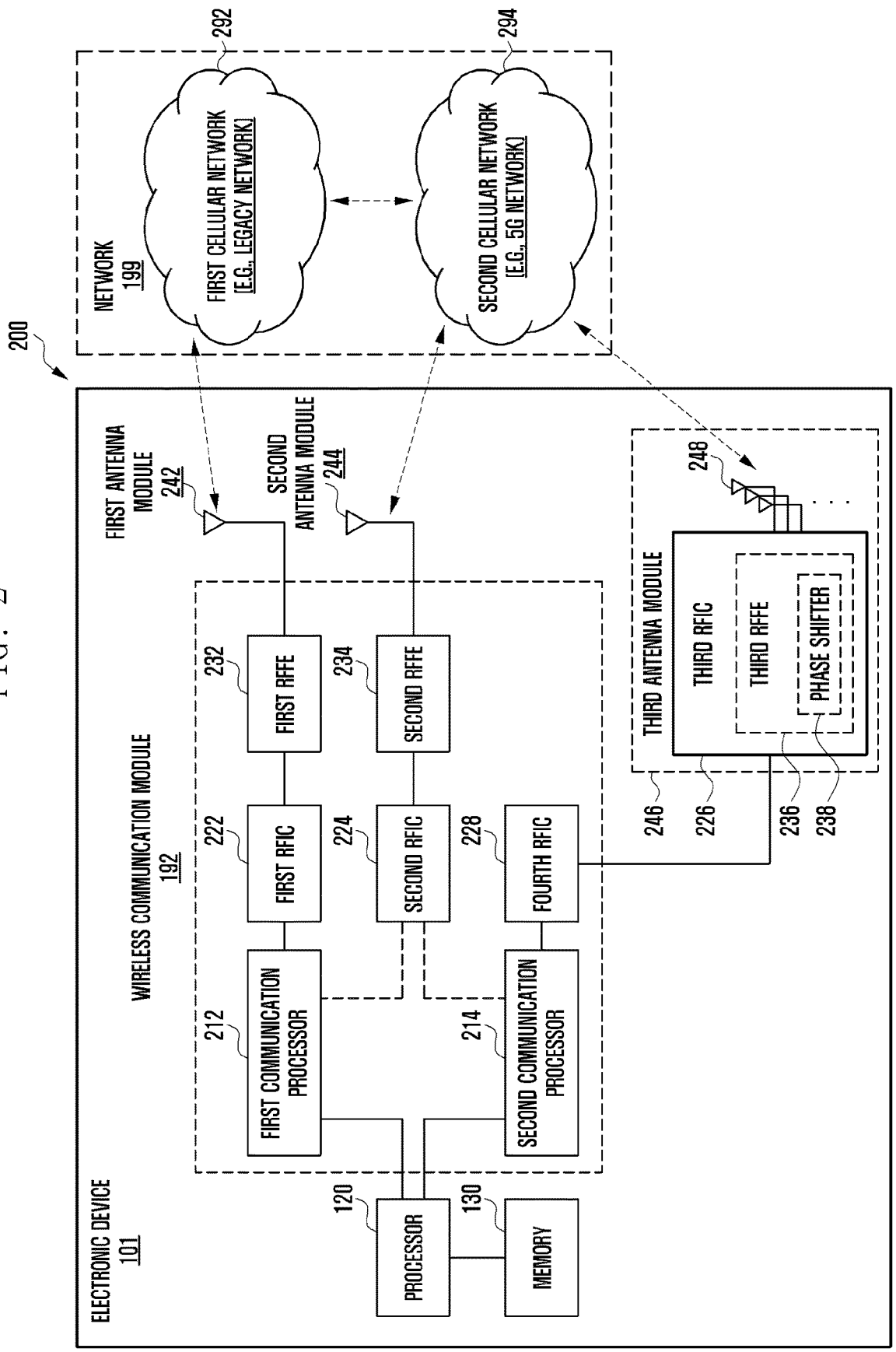
FIG. 2 is a block diagram of an electronic device for supporting legacy network communication and 5G network communication according to various embodiments.

FIG. 2 is a block diagram illustrating an electronic device in a network environment including a plurality of cellular networks according to an embodiment of the disclosure.

Referring to FIG. 2, the electronic device 101 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may establish a communication channel corresponding to a designated band (e.g., about 6 GHz to about 60 GHz) of bands to be used for wireless communication with the second cellular network 294, and support fifth generation (5G) network communication through the established communication channel. According to various embodiments, the second cellular network 294 may be a 5G network defined in 3rd generation partnership project (3GPP). Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3:
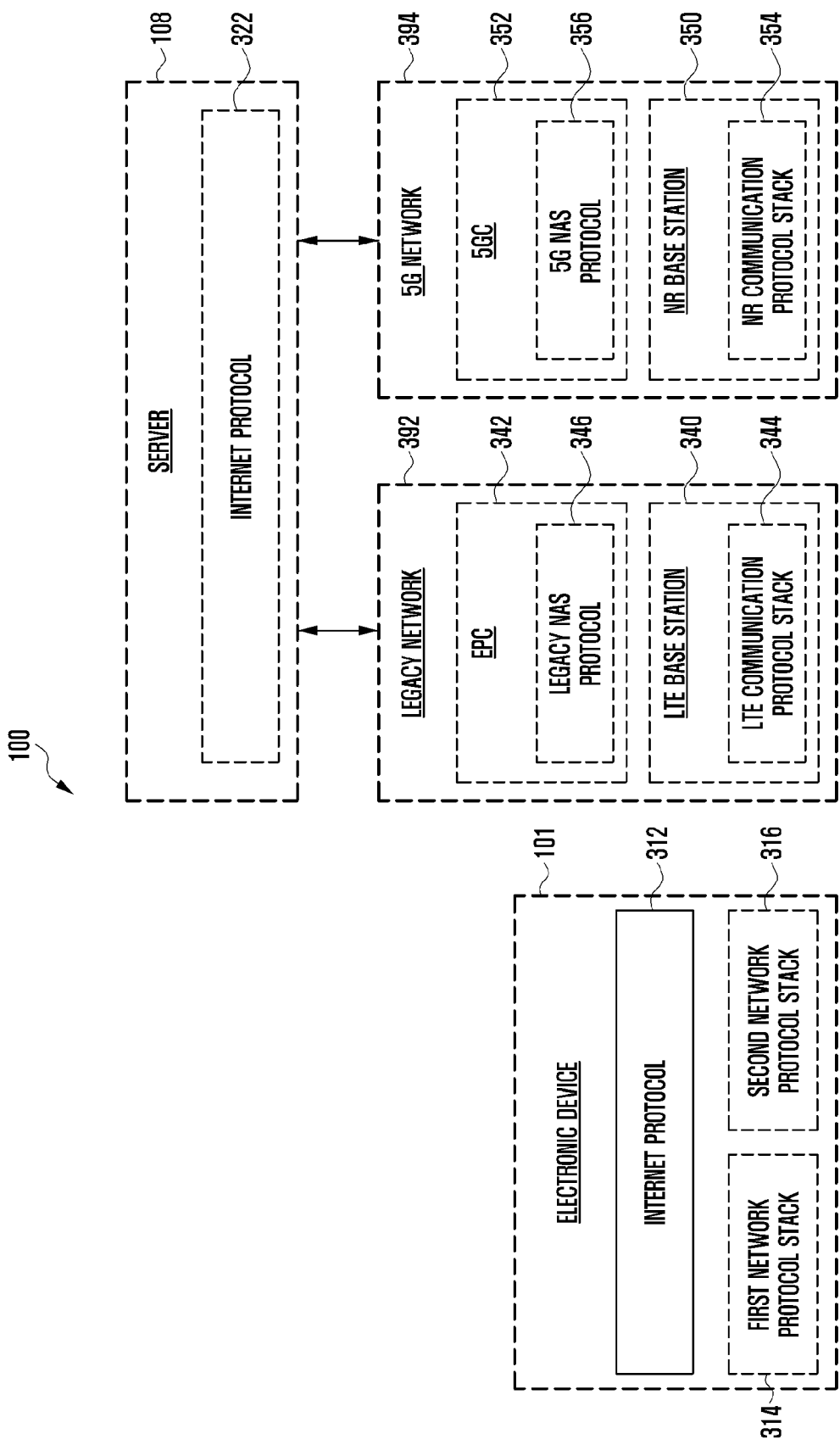
FIG. 3 illustrates a protocol stack structure of a network 100 of legacy communication and/or 5G communication according to an embodiment.

FIG. 3 illustrates a protocol stack structure of the network 100 of legacy communication and/or 5G communication according to an embodiment.

Referring to FIG. 3, the network 100 according to an illustrated embodiment may include the electronic device 101, a legacy network 392, a 5G network 394, and the server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment, the electronic device 101 may perform Interne communication associated with the server 108 through the Internet protocol 312 (for example, a TCP, a UDP, or an IP). The Internet protocol 312 may be executed by, for example, a main processor (for example, the main processor 121 of FIG. 1) included in the electronic device 101.

According to another embodiment, the electronic device 101 may perform wireless communication with the legacy network 392 through the first communication protocol stack 314. According to another embodiment, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment, the server 108 may include a cloud computing server existing outside the legacy network 392 or the 5G network 394. According to another embodiment, the server 108 may include an edge computing server (or a mobile edge computing (MEC) server) located inside at least one of the legacy network or the 5G network 394.

The legacy network 392 may include an LTE eNode B (eNB) 340 and an EPC 342. The LTE eNB 340 may include an LTE communication protocol stack 344. The EPC 342 may include a legacy NAS protocol 346. The legacy network 392 may perform LTE wireless communication with the electronic device 101 through the LTE communication protocol stack 344 and the legacy NAS protocol 346.

The 5G network 394 may include an NR gNB 350 and a 5GC 352. The NR gNB 350 may include an NR communication protocol stack 354. The 5GC 352 may include a 5G NAS protocol 356. The 5G network 394 may perform NR wireless communication with the electronic device 101 through the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment, the control plane protocol and the user plane protocol may include a physical (PHY) layer, a medium access control (MAC) layer, a radio link control (RLC) layer, or a packet data convergence protocol (PDCP) layer. The PHY layer may channel-code and modulate data received from, for example, a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARD) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QoS) of user data.

According to certain embodiments, the control plane protocol may include a radio resource control (RRC) layer and a non-access stratum (NAS) layer. The RRC layer may process control, for example, data related to radio bearer setup, paging, or mobility management. The NAS may process, for example, a control message related to authentication, registration, or mobility management.

Figure 4:
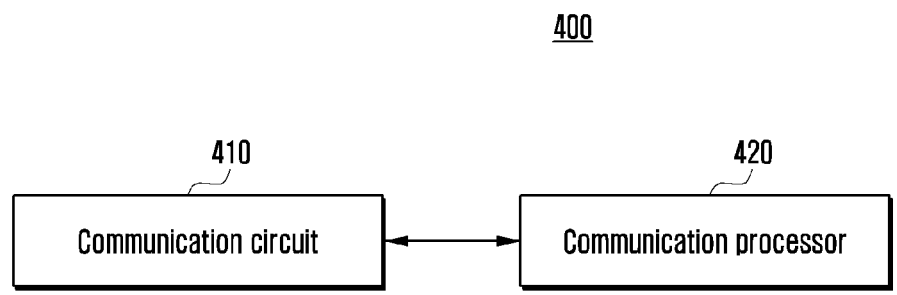
FIG. 4 illustrates an electronic device according to various embodiments of the disclosure.

FIG. 4 illustrates an electronic device according to various embodiments of the disclosure.

Referring to FIG. 4, an electronic device 400 (for example, the electronic device 101 of FIG. 1) according to various embodiments of the disclosure may include a communication circuit (for example, the wireless communication module of FIG. 1) 410 and/or a processor 420 (for example, the processor 120 of FIG. 1, the first communication processor 212 of FIG. 2, and/or the second communication processor 214 of FIG. 2).

According to various embodiments of the disclosure, the communication processor 420 may be operatively connected to the communication circuit 410. The communication processor 420 may control elements of the electronic device 400. For example, the communication processor 420 may control elements of the electronic device 400 according to one or more instructions stored in a memory (for example, the memory 130 of FIG. 1).

According to various embodiments of the disclosure, the communication circuit 410 may provide the electronic device 400 with communication with an external electronic device (for example, the external electronic device 104 of FIG. 1) through at least one network (for example, the legacy network 392 or the 5G network 394 of FIG. 3). For example, the communication circuit 410 may support communication between the electronic device 400 and the external electronic device 104 through the NR gNB 350 on the basis of the control of the communication processor 420.

According to various embodiments of the disclosure, the communication circuit 410 may support connected mode discontinuous reception (C-DRX). The C-DRX may be a mode for performing non-continuous reception in the state in which the electronic device 400 maintains the connection to the network 394. According to an embodiment, the electronic device 400 supporting C-DRX may receive a packet from the network 394 in an on-duration period in which the packet can be received from the network 394 and cannot receive a packet from the network 394 in a sleep direction in which packet reception from the network 394 is not possible.

According to various embodiments of the disclosure, the communication processor 420 may control the communication circuit 410 to activate components included in the communication circuit 410 for performing a packet reception function in the on-duration period and control the communication circuit 410 to deactivate components included in the communication circuit 410 for performing a packet reception function in the sleep duration. The communication processor 420 may switch the on-duration period to the sleep duration on the basis of an inactivity timer for entering a sleep mode supported by the C-DRX mode. According to an embodiment, the communication processor 420 may activate the inactivity timer according to reception of an uplink grant indicating allocation of resources to transmit a packet from the network 394. The communication processor 420 may control the communication circuit 410 to switch the on-duration period to the sleep duration on the basis of identification that a predetermined time corresponding to the inactivity timer expires.

The communication processor 420 may control the communication circuit 410 during one DRX cycle including the on-duration period and the sleep duration. The communication processor 420 may control the communication circuit 410 according to a new DRX cycle on the basis of expiration of the DRX cycle. The communication processor 420 may control the communication circuit 410 to activate components included in the communication circuit 410 for performing a packet reception function during the on-duration period of the new DRX cycle and control the communication circuit 410 to deactivate components included in the communication circuit 410 for performing a packet reception function during the sleep duration. The communication processor 420 may deactivate the packet reception function to reduce power consumption of the communication circuit 410.

According to various embodiments of the disclosure, the communication processor 420 may receive an RRC connection reconfiguration message from the network 394 as a part of the operation for making a connection or reconnection to the network 394. The RRC connection reconfiguration message may include C-DRX configuration information. The C-DRX configuration information may be configured by the network 394. The C-DRX configuration information may include a predetermined time corresponding to the inactivity timer and/or a length of the DRX cycle. The communication processor 420 may control the communication circuit 410 on the basis of the predetermined time/or length of the DRX cycle included in the C-DRX configuration information.

According to various embodiments of the disclosure, the communication processor 420 may transmit a packet through the network 394 during the on-duration period. The communication processor 420 may control the communication circuit 410 to transmit a scheduling request to the network 394 and perform packet transmission through the network 394 on the basis of reception of an uplink grant transmitted according to the scheduling request.

The transmitted packet may be a packet requiring a relatively short delay time. The packet requiring the short delay time may be a packet having a shorter time (delay time) spent until a response packet corresponding to the transmitted packet is received after transmission of the packet compared to other packets. In the state in which the response packet reaches the electronic device 400 in the sleep duration after the on-duration period including the time at which the packet is transmitted, the electronic device 400 may not receive the response packet in the sleep duration in which packet reception is deactivated. The electronic device 400 may receive the response packet in another on-duration period after the sleep duration. A reception time of the response packet by the electronic device 400 may be more delayed by the sleep duration. The delay time for reception of the response packet may be increased by the sleep duration.

Hereinafter, an embodiment for reducing the delay time for reception of the response packet is described.

According to various embodiments of the disclosure, the communication processor 420 may determine whether to change a length of the sleep duration of the C-DRX on the basis of the state of the electronic device 400.

According to various embodiments of the disclosure, the state of the electronic device 400 may include a state related to the delay time of the response packet. According to an embodiment, the communication processor 420 may identify the delay time of the response packet and determine to change the length of the sleep duration of the C-DRX on the basis of identification that the delay time of the response packet is longer than or equal to a predetermined time. According to an embodiment, the communication processor 420 may determine to change the length of the sleep duration of the C-DRX on the basis of the delay time of the response packet longer than or equal to the predetermined time. When the length of the sleep duration is reduced, the length of the on-duration period may increase. When the response packet is received within the on-duration period having the increased length, the delay time may be reduced compared to the case in which the response packet is received in a next on-duration period.

According to various embodiments of the disclosure, when the on-duration period in which the response packet is received is different from the on-duration period in which the packet is transmitted, the communication processor 420 may determine to change the length of the sleep duration of the C-DRX.

According to various embodiments of the disclosure, when the on-duration period in which the response packet is received is different from the on-duration period in which the packet is transmitted, the communication processor 420 may activate a timer for detecting the reception delay of the response packet. When the response packet is received in an on-duration period different from the on-duration period in which the response packet is received before the activated timer expires, the communication processor 420 may determine to change the length of the sleep duration of the C-DRX.

According to various embodiments of the disclosure, the state of the electronic device 400 may include a state related to the operation mode of the electronic device 400. The electronic device 400 may operate in one of a power-saving mode for reducing power consumption of the electronic device 400 and/or a high-performance mode for increasing processing performance of the electronic device 400. The communication processor 420 may receive information indicating the operation mode of the electronic device 400 from an application processor (for example, the processor 120 of FIG. 1). The communication processor 420 may determine to change the length of the sleep duration of the C-DRX on the basis of information indicating the operation mode of the electronic device 400, transmitted by the application processor 120.

According to an embodiment, the communication processor 420 may identify that the electronic device 400 is in the high-performance mode on the basis of state information of the electronic device 400 and determine to reduce the length of the sleep duration of the C-DRX.

According to an embodiment, the communication processor 420 may identify that the electronic device 400 is in the power-saving mode on the basis of state information of the electronic device 400 and determine to increase the length of the sleep duration of the C-DRX. When the length of the sleep duration is increased, the deactivated state of the communication circuit 410 may be maintained for a relatively long time and power consumption of the electronic device 400 may be reduced.

According to various embodiment of the disclosure, the state of the electronic device 400 may be a state related to an application executed by the electronic device 400. The communication processor 420 may receive information indicating execution of an application determined by the application processor (for example, the processor 120 of FIG. 1). The determined application may be an application requiring a short delay time for packet reception. According to an embodiment, the determined application may be an application requiring fast reception of a packet. For example, the determined application may include a game application or a messenger application.

The communication processor 420 may determine to change the length of the sleep duration of the C-DRX on the basis of transmission of information indicating execution of the determined application by the application processor 120. The communication processor 420 may determine to reduce the length of the sleep duration of the C-DRX on the basis of transmission of information indicating execution of the determined application by the application processor 120.

According to another embodiment, the application processor 120 may transmit a signal indicating a change in the length of the sleep duration of the C-DRX to the communication processor 420 in accordance with state information of the electronic device 400. The communication processor 420 may perform a series of operations for changing the length of the sleep duration of the C-DRX on the basis of reception of the signal indicating the change in the length of the sleep duration of the C-DRX.

According to various embodiments of the disclosure, the state of the electronic device 400 may include the remaining capacity of a battery (for example, the battery 189 of FIG. 1) of the electronic device 400 or a temperature of the electronic device 400. The communication processor 420 may perform a series of operations for changing the length of the sleep duration of the C-DRX on the basis of the remaining capacity of the battery 189 of the electronic device 400 or the temperature of the electronic device 400 satisfying a predetermined condition, received from the application processor 120.

According to various embodiments of the disclosure, the communication processor 420 may perform a series of operations for changing the length of the sleep duration of the C-DRX on the basis of determination of the change in the length of the sleep duration of the C-DRX.

The communication processor 420 may transmit UE assistance information for changing the length of the sleep duration of the C-DRX to the network 394. The UE assistance information is information including a configured value of a parameter preferred by the electronic device 400 and may be one of elements which can be considered in the configuration of various parameters by the network 394. The UE assistance information may include a preferred DRX parameter. The preferred DRX parameter is a parameter for implementing a C-DRX operation required by the electronic device 400 and may include a predetermined preferred time of the inactivity timer (preferred DRX inactivity timer) and/or a preferred length of the DRX cycle (preferred DRXLongCycle or preferred DRX shortCycle).

According to various embodiments of the disclosure, the communication processor 420 may transmit UE assistance information including information for reducing the length of the sleep duration to the network 394 in response to determination of reduction in the length of the sleep duration of the C-DRX on the basis of state information of the electronic device 400.

According to an embodiment, the communication processor 420 may configure the predetermined preferred time as a value larger than the conventionally configured time and transmit UE assistance information including the preferred DRX parameter including the changed time to the network 494.

The changed time may be larger than the time conventionally configured in the inactivity timer. According to an embodiment, the changed time may be a time configured to perform transmission of the packet and reception of the response packet in the same on-duration period. The changed time is a time larger than the conventionally configured time and may have a value equal to or smaller than a half of the length of the DRX cycle.

According to an embodiment, the communication processor 420 may configure the preferred length of the DRX cycle as a value having the size smaller than the conventional length of the DRX cycle in response to determination of reduction in the length of the sleep duration of the C-DRX on the basis of state information of the electronic device 400, and transmit UE assistance information including the preferred DRX parameter including the preferred length of the DRX cycle to the network 494. When the length of the on-duration period is maintained and the length of the DRX cycle is reduced, the length of the sleep duration may be reduced.

According to various embodiments of the disclosure, the communication processor 420 may transmit UE assistance information including information for increasing the length of the sleep duration to the network 394 in response to determination of the increase in the length of the sleep duration of the C-DRX on the basis of state information of the electronic device 400.

According to an embodiment, the communication processor 420 may configure the predetermined preferred time as a value smaller than the conventionally configured time and transmit UE assistance information including the preferred DRX parameter including the changed time to the network 494.

According to an embodiment, the communication processor 420 may configure the preferred length of the DRX cycle as a value having the size larger than the conventional length of the DRX cycle in response to determination of the increase in the length of the sleep duration of the C-DRX according to state information of the electronic device 400, and transmit UE assistance information including the preferred DRX parameter including the preferred length of the DRX cycle to the network 494. When the length of the on-duration period is maintained and the length of the DRX cycle is increased, the length of the sleep duration may be increased.

According to various embodiments of the disclosure, the communication processor 420 may transmit UE assistance information to the network 394 on the basis of reception of an RRC reconfiguration message including information indicating that the UE assistance information can be transmitted from the network 397. The network 394 may generate C-DRX configuration information on the basis of the predetermined preferred time of the inactivity timer (preferred DRX inactivity timer) and/or the preference length of the DRX cycle included in the UE assistance information. The C-DRX configuration information may include a predetermined time (corresponding to the inactivity timer) having the same value as the predetermined preferred time and/or the length of the DRX cycle having the same value as the preferred length. The network 394 may transmit the RRC reconfiguration message including the C-DRX configuration information to the electronic device 400 as a part of the operation for making the RRC connection again in the state in which the RRC connection between the electronic device 400 and the network 394 is released.

According to various embodiments of the disclosure, the communication processor 420 may control the operation related to the C-DRX of the communication circuit 410 on the basis of the C-DRX configuration information included in the RRC reconfiguration message. The communication processor 420 may control the inactivity timer on the basis of a predetermined time included in the C-DRX configuration information. The communication processor 420 may switch the reception function of the communication circuit 410 from an activated state to a deactivated state in response to expiration of the changed time. The communication processor 420 may switch the reception function of the communication circuit 410 to the activated state after a time corresponding to the length of the DRX cycle passes in the state in which the reception function of the communication circuit 410 is maintained in the deactivated state.

The electronic device 400 according to various embodiments of the disclosure may change a length of a deactivated section of the DRX cycle on the basis of the state of the electronic device 400. The electronic device 400 may reduce the delay time of the response packet by reducing the length of the deactivated section of the DRX cycle on the basis of the state of the electronic device 400. The electronic device 400 may reduce the size of power consumption of the electronic device 400 by increasing the length of the deactivated section of the DRX cycle on the basis of the state of the electronic device 400.

Figure 5A:
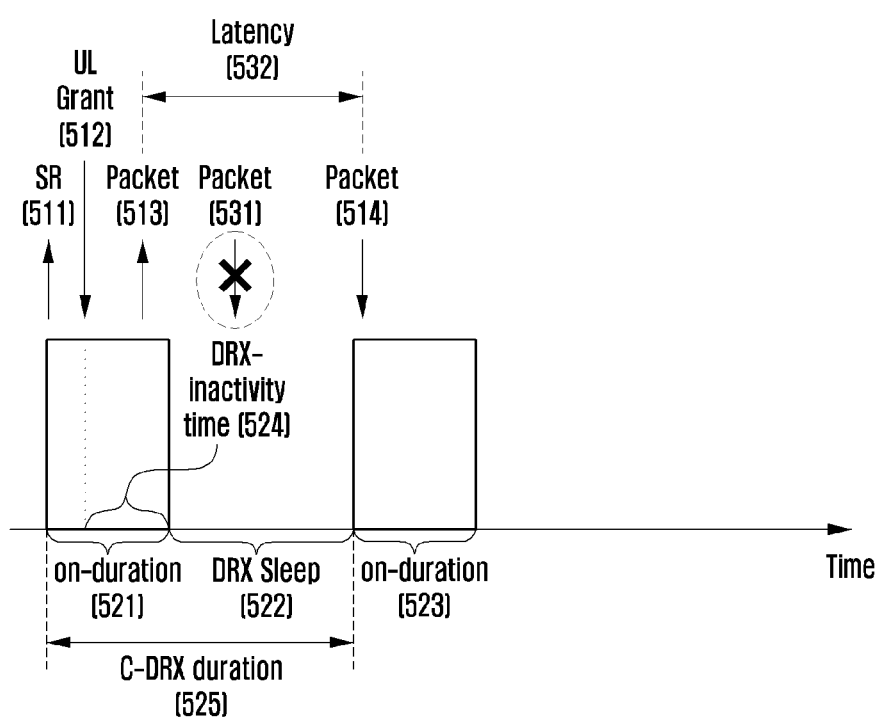
FIGS. 5A and 5B illustrate examples of reducing a delay time for packet reception by controlling a sleep duration of C-DRX by an electronic device according to various embodiments of the disclosure.
Figure 5B:
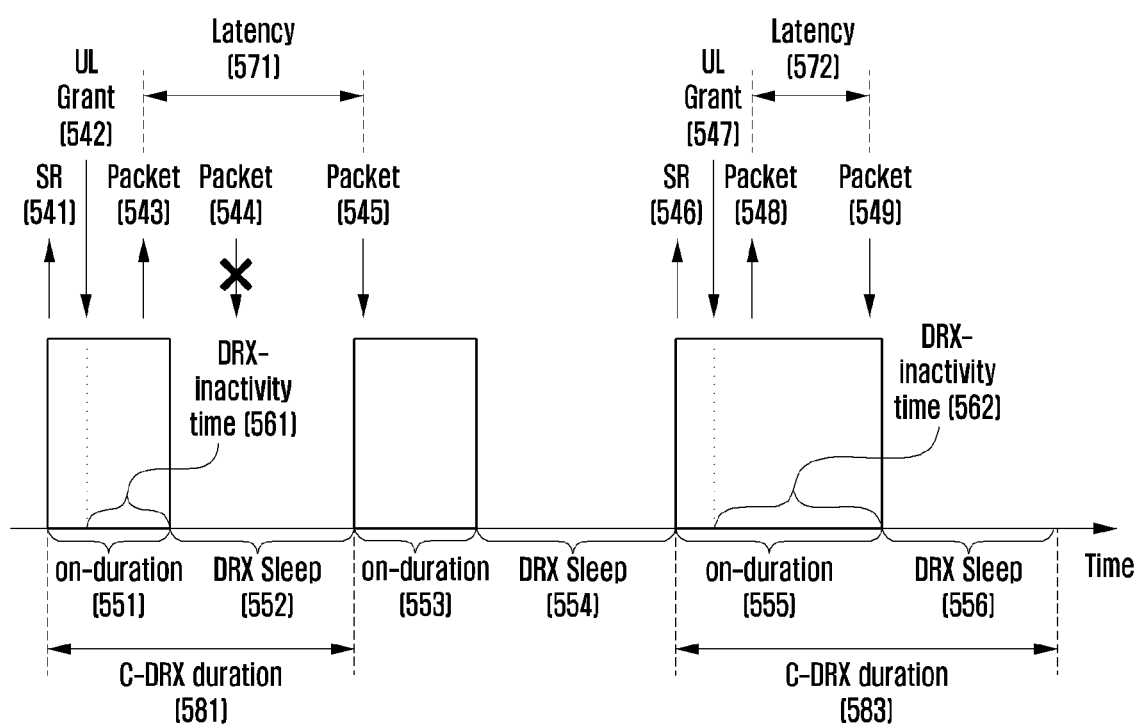

FIGS. 5A and 5B illustrate examples of reducing a delay time for packet reception by controlling a sleep duration of C-DRX by an electronic device according to various embodiments of the disclosure.

Referring to FIG. 5A, the electronic device 400 may support C-DRX. The electronic device 400 may control a reception function of a communication circuit (for example, the communication circuit 410 of FIG. 4) in a C-DRX duration 525 including a first on-duration period 521 and a sleep duration 522. The electronic device 400 may activate a reception function of the communication circuit 410 during the first on-duration period 521. The electronic device 400 may deactivate the reception function of the communication circuit 410 in the sleep duration 522.

According to various embodiments of the disclosure, the electronic device 400 may receive C-DRX configuration information including a length of the C-DRX duration 525 and/or a predetermined time 524 of an inactivity timer from a network (for example, the 5G network 394 of FIG. 3). The electronic device 400 may control the communication circuit 410 on the basis of the C-DRX configuration information.

According to various embodiments of the disclosure, the electronic device 400 may transmit a scheduling request (SR) 511 to the network 394 during the first on-duration period 521. The electronic device 400 may receive an uplink grant 512 indicating allocation of resources to transmit a packet according to the scheduling request and transmit a packet 513 to the network 394 for the first on-duration period 521.

According to various embodiments of the disclosure, after receiving the uplink grant 512, the electronic device 400 may activate the inactivity timer for a predetermined time 524. The electronic device 400 may deactivate the reception function of the communication circuit 410 during the sleep duration 522 as the predetermined time 524 has expired.

According to various embodiments of the disclosure, the electronic device 400 may not receive a packet 531 from the network 394 during the sleep duration 522. The network 394 may retransmit a response packet in response to non-reception of a message (for example, ack) indicating reception of the response packet 531 from the electronic device 400. The electronic device 400 may receive a response packet 514 from the network 394 in a second on-duration period 523.

The electronic device 400 may not receive the response packet 531 in the sleep duration 522 in the state in which the response packet reaches the electronic device 400 in the sleep duration 522 after the first on-duration period 521 including a time at which the packet is transmitted. Reception of the response packet 514 may be delayed by the sleep duration 522.

Referring to FIG. 5B, the electronic device 400 may control a reception function of a communication circuit (for example, the communication circuit 410 of FIG. 4) in a DRX duration 581 including a first on-duration period 551 and a sleep duration 552. The electronic device 400 may activate a reception function of the communication circuit 410 during the first on-duration period 551. The electronic device 400 may deactivate the reception function of the communication circuit 410 in the sleep duration 552.

According to various embodiments, the electronic device 400 may receive C-DRX configuration information including a length of the C-DRX duration 581 (e.g., conventional length) and/or a predetermined time 561 of an inactivity timer from a network (for example, the 5G network 394 of FIG. 3). The electronic device 400 may control the communication circuit 410 on the basis of the C-DRX configuration information.

According to various embodiments of the disclosure, the electronic device 400 may transmit a scheduling request (SR) 541 to the network 394 during the first on-duration period 551. The electronic device 400 may receive an uplink grant 542 indicating allocation of resources to transmit a packet according to the scheduling request and transmit a packet 543 to the network 394 during the first on-duration period 551.

According to various embodiments of the disclosure, after receiving the uplink grant 542, the electronic device 400 may activate the inactivity timer for a predetermined time 561. The electronic device 400 may deactivate the reception function of the communication circuit 410 during the sleep duration 561 (e.g., configured time) as the predetermined time 552 has expired.

According to various embodiments of the disclosure, the electronic device 400 may not receive a packet 544 from the network 394 during the sleep duration 552. The network 394 may retransmit the response packet 545 in response non-response of a message (for example, ack) indicating reception of the response packet 544 from the electronic device 400. The electronic device 400 may receive a response packet 545 from the network 394 in a second on-duration period 553.

The electronic device 400 may not receive the response packet 544 in the sleep duration 552 in the state in which the response packet reaches the electronic device 400 in the sleep duration 552 after the first on-duration period 551 including a time at which the packet is transmitted. Reception of the response packet 544 may be delayed by the sleep duration 552.

According to various embodiments of the disclosure, the electronic device 400 may determine a change in the length of the sleep duration of the C-DRX on the basis of non-reception of the response packet 545 in the on-duration period (for example, the first on-duration period 551) in which the packet is transmitted. For example, when the on-duration period (for example, the second on-duration period 553) in which the response packet 545 is received and the on-duration period (for example, the first on-duration period 551) in which the packet 543 is transmitted are different from each other, the electronic device 400 may determine to change the length of the sleep duration of the C-DRX.

Although no illustrated in FIG. 5B, when the on-duration period (for example, the second on-duration period 553) in which the response packet 545 is received and the on-duration period (for example, the first on-duration period 551) in which the packet 543 is transmitted are different from each other, the electronic device 400 may activate a timer for detecting a reception delay of another response packet. When the response packet is received in an on-duration period different from the on-duration period in which the response packet is received before the activated timer expires, the communication processor 420 may determine to change the length of the sleep duration of the C-DRX.

According to various embodiments of the disclosure, the electronic device 400 may perform a series of operations for changing the length of the sleep duration of the C-DRX on the basis of determination to change the length of the sleep duration of the C-DRX.

The electronic device 400 may transmit UE assistance information for changing the length of the sleep duration of the C-DRX to the network 394. The UE assistance information may include a preferred DRX parameter. The preferred DRX parameter is a parameter for implementing a C-DRX operation required by the electronic device 400 and may include a predetermined preferred time of the inactivity timer (preferred DRX inactivity timer) and/or a preferred length of the DRX cycle (preferred DRXLongCycle).

According to various embodiments of the disclosure, the electronic device 400 may transmit UE assistance information including information for reducing the length of the sleep duration to the network 394 in response to determination to reduction in the length of the sleep duration of the C-DRX.

According to an embodiment, the electronic device 400 may configure a determined preferred time 562 as a value larger than the conventionally configured time 561 and transmit UE assistance information including the preferred DRX parameter including the changed time 562 to the network 494.

The changed time 562 may be larger than the time 561 conventionally configured in the inactivity timer. According to an embodiment, the changed time 562 is a time larger than the conventionally configured time 561 and may have a value equal to or smaller than a half of the length of the DRX duration.

According to an embodiment, the electronic device 400 may configure a preferred length 583 of the DRX duration as a value having the size smaller than a conventional length 581 of the DRX duration in response to determination to reduce the length of the sleep duration of the C-DRX and transmit UE assistance information including a preferred DRX parameter including the preferred length 583 of the DRX duration to the network 494. When the length of the on-duration period is maintained and the length of the DRX cycle is reduced, the length of the sleep duration may be reduced.

The network 394 may generate C-DRX configuration information on the basis of the predetermined preferred time of the inactivity timer (preferred DRX inactivity timer) and/or the preference length of the DRX duration (preferred DRXLongCycle or preferred DRX shortcycle) included in the UE assistance information. The C-DRX configuration information may include a predetermined time (corresponding to the inactivity timer) having the same value as the predetermined preferred time and/or the length of the DRX duration having the same value as the preferred length. The network 394 may transmit the RRC reconfiguration message including the C-DRX configuration information to the electronic device 400 as a part of the operation for making the RRC connection again in the state in which the RRC connection between the electronic device 400 and the network 394 is released.

According to various embodiments of the disclosure, the electronic device 400 may control an operation related to the C-DRX of the communication circuit 410 on the basis of C-DRX configuration information included in an RRC reconfiguration message.

According to various embodiments of the disclosure, the electronic device 400 may transmit a scheduling request (SR) 546 to the network 394 during the third on-duration period 555. The electronic device 400 may receive an uplink grant 547 indicating allocation of resources to transmit a packet according to the scheduling request and transmit the packet 548 to the network 394 during the third on-duration period 555.

According to various embodiments of the disclosure, after receiving the uplink grant 547, the electronic device 400 may activate the inactivity timer for a predetermined time 562. The predetermined time 562 in the third on-duration period 555 may be larger than the predetermined time 561 in the first on-duration period 551. The electronic device 400 may receive the response packet 549 from the network before the predetermined time expires.

Referring to FIG. 5B, it may be identified that a delay time 572 corresponding to a difference between a time at which the packet 548 is transmitted and a time at which the response packet 549 is received is further reduced compared to the delay time 571 corresponding to the difference between the time at which the packet 543 is transmitted and the time at which the response packet 545 is received.

Figure 6:
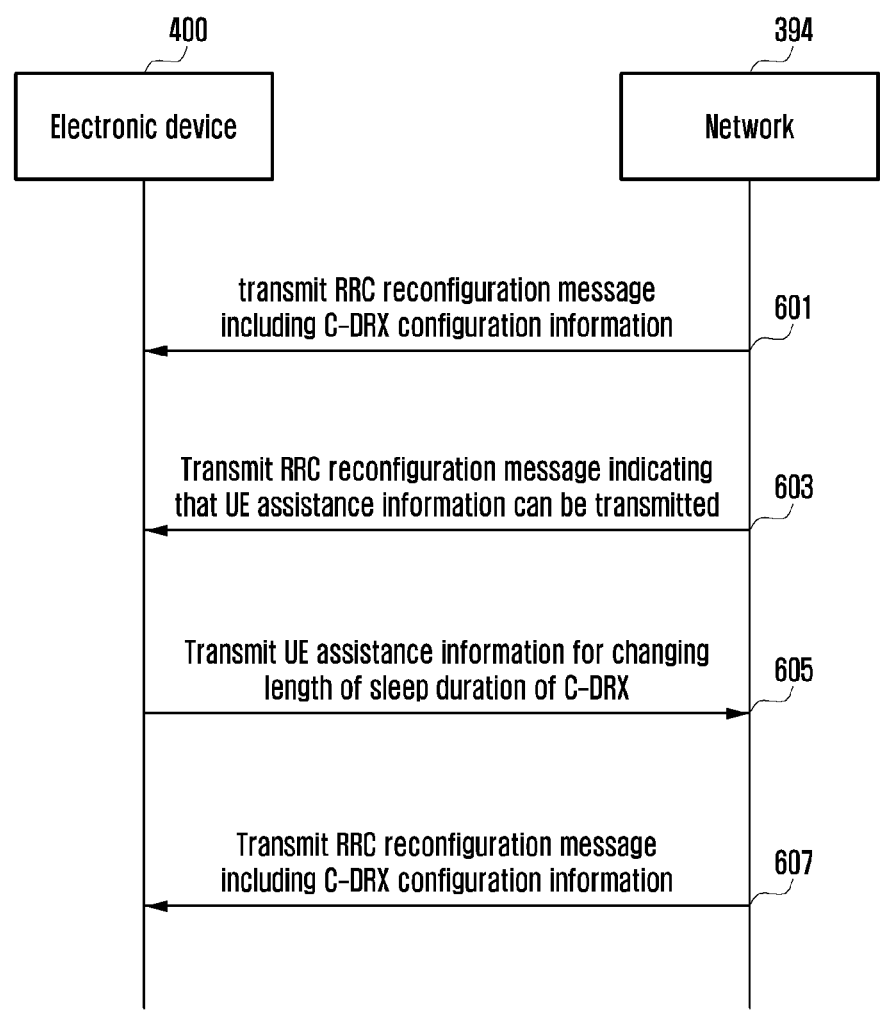
FIG. 6 illustrates an operation between an electronic device and a network according to various embodiments of the disclosure.

FIG. 6 illustrates an operation between an electronic device and a network according to various embodiments of the disclosure.

According to various embodiments of the disclosure, a network (for example, the 5G network 394 of FIG. 3) may transmit an RRC reconfiguration message including C-DRX configuration information to an electronic device (for example, the electronic device 400 of FIG. 4) in operation 601.

The C-DRX configuration information may include a predetermined time corresponding to the inactivity timer and/or a length of the DRX cycle. The electronic device 400 may control a communication circuit (for example, the communication circuit 410 of FIG. 4) on the basis of a predetermined time and/or a length of DRX duration included in C-DRX configuration information.

According to various embodiments of the disclosure, the electronic device 400 may control the communication circuit 410 to activate components included in the communication circuit 410 for performing a packet reception function in the on-duration period of the C-DRX cycle and control the communication circuit 410 to deactivate components included in the communication circuit 410 for performing a packet reception function in the sleep duration of the C-DRX. The electronic device 400 may switch the on-duration period to the sleep duration on the basis of an inactivity timer for entering a sleep mode supported by the C-DRX mode. According to an embodiment, the electronic device 400 may activate the inactivity timer according to reception of an uplink grant indicating allocation of resources to transmit a packet from the network 394. The electronic device 400 may control the communication circuit 410 to switch the on-duration period to the sleep duration on the basis of identification that a predetermined time corresponding to the inactivity timer expires.

According to various embodiments of the disclosure, the network 394 may transmit an RRC reconfiguration message, indicating that transmission of UE assistance information can be transmitted, to the electronic device 400 in operation 603.

According to various embodiments of the disclosure, the electronic device 400 may determine whether to change the length of the sleep duration of the C-DRX on the basis of state information of the electronic device 400. The electronic device 400 may change the length of the sleep duration of the COdRX by using UE assistance information according to determination to change the length of the sleep duration of the C-DRX.

According to various embodiments of the disclosure, the electronic device 400 may transmit UE assistance information for changing the length of the sleep duration of the C-DRX to the network 394 in operation 605.

According to various embodiments of the disclosure, the electronic device 400 may transmit UE assistance information including information for reducing the length of the sleep duration to the network 394 in response to determination to reduce the length of the sleep duration of the C-DRX on the basis of state information of the electronic device 400.

According to an embodiment, the electronic device 400 may configure a predetermined preferred time as a value larger than the conventionally configured time and transmit a preferred DRX parameter including the changed time to the network 494.

The changed time may be larger than the time conventionally configured in the inactivity timer. According to an embodiment, the changed time is a time larger than the conventionally configured time and may have a value equal to or smaller than a half of the length of the DRX duration.

According to an embodiment, the electronic device 400 may configure a preferred length of the DRX duration as a value having the size smaller than the conventional length of the DRX duration in response to determination to reduce the length of the sleep duration of the C-DRX and transmit UE assistance information including a preferred DRX parameter including the preferred length of the DRX duration to the network 494. When the length of the on-duration period is maintained and the length of the DRX cycle is reduced, the length of the sleep duration may be reduced.

According to various embodiments of the disclosure, the electronic device 400 may transmit UE assistance information including information for increasing the length of the sleep duration to the network 394 in response to determination to increase the length of the sleep duration of the C-DRX on the basis of state information of the electronic device 400.

According to an embodiment, the electronic device 400 may configure the determined preferred time as a value smaller than the conventionally configured time and transmit UE assistance information including the preferred DRX parameter including the changed time to the network 494.

According to an embodiment, the electronic device 400 may configure the preferred length of the DRX duration as a value having the size larger than the conventional length of the DRX duration in response to determination to increase the length of the sleep duration of the C-DRX on the basis of state information of the electronic device 400 and transmit UE assistance information including the preferred DRX parameter including the preferred length of the DRX duration to the network 494. When the length of the on-duration period is maintained and the length of the DRX duration is reduced, the length of the sleep duration may be increased.

According to various embodiments of the disclosure, the network 394 may transmit an RRC reconfiguration message including C-DRX configuration information to the electronic device 400 in operation 607.

The network 394 may generate C-DRX configuration information on the basis of the predetermined preferred time of the inactivity timer (preferred DRX inactivity timer) and/or the preference length of the DRX duration (preferred DRXLongCycle) included in the UE assistance information. The C-DRX configuration information may include a predetermined time (corresponding to the inactivity timer) having the same value as the predetermined preferred time and/or the length of the DRX duration having the same value as the preferred length. The network 394 may transmit the RRC reconfiguration message including the C-DRX configuration information to the electronic device 400 as a part of the operation for making the RRC connection again in the state in which the RRC connection between the electronic device 400 and the network 394 is released.

According to various embodiments of the disclosure, the electronic device 400 and/or the network 394 may release activation of the C-DRX mode by releasing the RRC connection.

An electronic device according to various embodiments of the disclosure includes: a communication processor configured to support a connected mode discontinuous reception (C-DRX); and a communication circuit configured to switch a first on-duration period to a sleep duration according to expiration of a predetermined time corresponding to an inactivity timer, wherein the communication processor is configured to determine whether to change a length of the sleep duration of the C-DRX, based on a state of the electronic device, control the communication circuit to transmit UE assistance information for changing the length of the sleep duration of the C-DRX, based on the determination, to a network, and control an operation related to the C-DRX of the communication circuit, based on the inactivity timer having a changed predetermined time included in an RRC reconfiguration message received according to an RRC connection with the network.

In the electronic device according to various embodiments of the disclosure, the communication processor may be configured to transmit a first packet to the network in a first on-duration period, and control the communication circuit to transmit the UE assistance information to the network in response to detection of reception of a first response packet transmitted by the network in a second on-duration period different from the first on-duration period.

In the electronic device according to various embodiments of the disclosure, the communication processor may be configured to activate a timer for detecting a reception delay of the response packet for a predetermined time in response to detection of reception of the response packet in the second on-duration period, and control the communication circuit to transmit the UE assistance information to the network in response to reception of the response packet transmitted by the network in a third on-duration period different from the second on-duration period before the timer expires.

In the electronic device according to various embodiments of the disclosure, the UE assistance information may include information for reducing the length of the sleep duration.

In the electronic device according to various embodiments of the disclosure, the information for reducing the length of the sleep duration may include inactivity timer information indicating a time longer than a predetermined time corresponding to the inactivity timer.

In the electronic device according to various embodiments of the disclosure, the communication processor may be configured to control the communication circuit to transmit UE assistance information for reducing the length of sleep duration of the C-DRX to the network in response to identification that the electronic device operates in a high-performance mode, based on state information of the electronic device.

In the electronic device according to various embodiments of the disclosure, the communication processor may be configured to control the communication circuit to transmit UE assistance information for increasing the length of the sleep duration of the C-DRX to the network in response to identification that the electronic device operates in a power-saving mode, based on state information of the electronic device.

In the electronic device according to various embodiments of the disclosure, the UE assistance information may include C-DRX cycle information indicating a length having a value larger than the length of the C-DRX cycle.

In the electronic device according to various embodiments of the disclosure, the communication processor may be configured to control the communication circuit to transmit UE assistance information for reducing the length of the sleep duration of the C-DRX to the network in response to identification that a predetermined application is executed, based on state information of the electronic device.

In the electronic device according to various embodiments of the disclosure, the predetermined application may include an application capable of performing a function requiring a low delay time, and the delay time is a difference between a time at which a packet is transmitted to the network and a time at which a response packet corresponding to the packet is received from the network.

Figure 7:
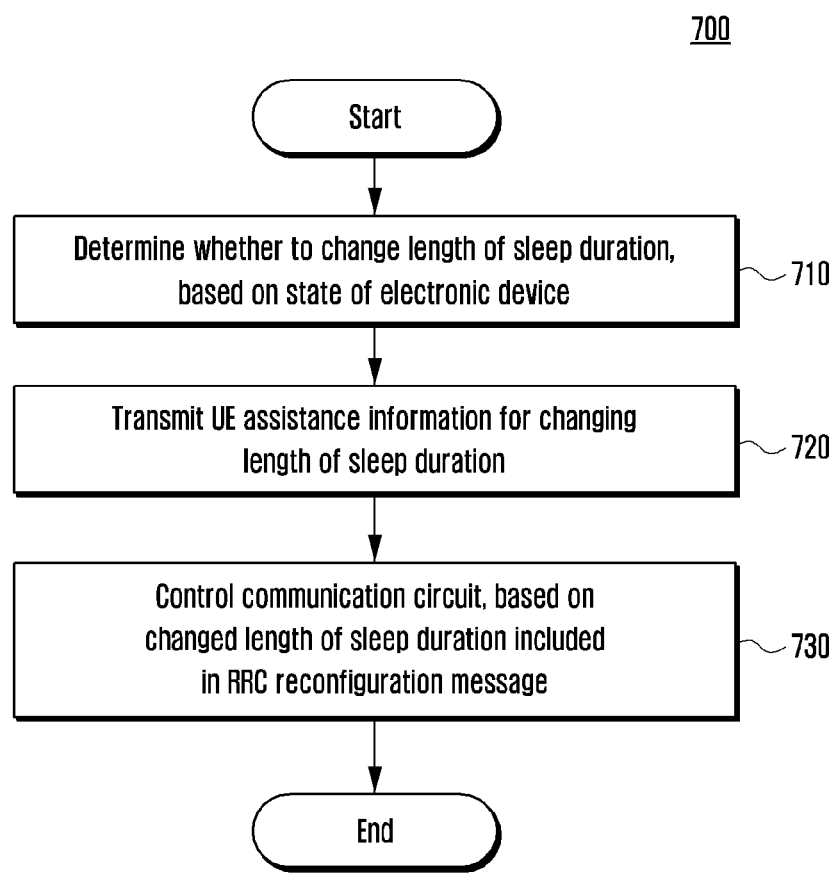
FIG. 7 is a flowchart illustrating the operation in a method of operating an electronic device according to various embodiments of the disclosure.

FIG. 7 is a flowchart illustrating the operation in a method of operating an electronic device according to various embodiments of the disclosure.

According to various embodiments of the disclosure, in operation 710, an electronic device (for example, the electronic device 400 of FIG. 4) may determine whether to change a length of a sleep duration on the basis of a state of the electronic device 400.

According to various embodiments of the disclosure, the state of the electronic device 400 may include a state related to the delay time of the response packet. According to an embodiment, the communication processor 420 may identify the delay time of the response packet and determine to change the length of the sleep duration of the C-DRX on the basis of identification that the delay time of the response packet is longer than or equal to a predetermined time. According to an embodiment, the communication processor 420 may determine to change the length of the sleep duration of the C-DRX on the basis of the delay time of the response packet longer than or equal to the predetermined time. When the length of the sleep duration is reduced, the length of the on-duration period may increase. When the response packet is received within the on-duration period having the increased length, the delay time may be reduced compared to the case in which the response packet is received in a next on-duration period.

According to various embodiments of the disclosure, when the on-duration period in which the response packet is received and the on-duration period in which the packet is transmitted are different from each other, the electronic device 400 may change the length of the sleep duration of the C-DRX.

According to various embodiments of the disclosure, when the on-duration period in which the response packet is received and the on-duration period in which the packet is transmitted are different from each other, the electronic device 400 may activate a timer for detecting a reception delay of the response packet. When the response packet is received in the on-duration period different from the on-duration period in which the response packet is received before the activated timer expires, the electronic device 400 may determine to change the length of the sleep duration of the C-DRX.

According to various embodiments of the disclosure, the state of the electronic device 400 may include a state related to the operation mode of the electronic device 400. The electronic device 400 may operate in one of a power-saving mode for reducing power consumption of the electronic device 400 and/or a high-performance mode for increasing processing performance of the electronic device 400. The electronic device 400 may receive information indicating an operation mode of the electronic device 400 from an application processor (for example, the processor 120 of FIG. 1). The electronic device 400 may determine to change the length of the sleep duration of the C-DRX on the basis of information indicating the operation mode of the electronic device 400, transmitted by the application processor 120.

According to an embodiment, the electronic device 400 may identify that the electronic device 400 is in a high-performance mode on the basis of state information of the electronic device 400 and determine to reduce the length of the sleep duration of the C-DRX.

According to an embodiment, the electronic device 400 may identify that the electronic device 400 is in a power-saving mode on the basis of state information of the electronic device 400 and determine to increase the length of the sleep duration of the C-DRX. When the length of the sleep duration is increased, the deactivated state of the communication circuit 410 may be maintained for a relatively long time and power consumption of the electronic device 400 may be reduced.

According to various embodiment of the disclosure, the state of the electronic device 400 may be a state related to a predetermined application executed by the electronic device 400. The determined application may be an application requiring a short delay time for packet reception. According to an embodiment, the determined application may be an application requiring fast reception of a packet. For example, the determined application may include a game application or a messenger application.

The electronic device 400 may determine to change the length of the sleep duration of the C-DRX on the basis of execution of the predetermined application. The electronic device 400 may determine to reduce the length of the sleep duration of the C-DRX on the basis of execution of the predetermined application.

According to various embodiments of the disclosure, the state of the electronic device 400 may include the remaining capacity of a battery (for example, the battery 189 of FIG. 1) of the electronic device 400 or a temperature of the electronic device 400. The electronic device 400 may perform a series of operations for changing the length of the sleep duration of the C-DRX on the basis of the remaining capacity of the battery 189 of the electronic device 400 or the temperature of the electronic device 400 satisfying a predetermined condition, received from the application processor 120.

According to various embodiments of the disclosure, in operation 720, the electronic device 400 may transmit UE assistance information for changing the length of the sleep duration to a network (for example, the 5G network 394 of FIG. 3).

According to various embodiments of the disclosure, the electronic device 400 may transmit UE assistance information including information for reducing the length of the sleep duration to the network 394 in response to determination to reduce the length of the sleep duration of the C-DRX on the basis of state information of the electronic device 400.

According to an embodiment, the electronic device 400 may configure a predetermined preferred time as a value larger than the conventionally configured time and transmit a preferred DRX parameter including the changed time to the network 494.

The changed time may be larger than the time conventionally configured in the inactivity timer. According to an embodiment, the changed time is a time larger than the conventionally configured time and may have a value equal to or smaller than a half of the length of the DRX duration.

According to an embodiment, the electronic device 400 may configure a preferred length of the DRX duration as a value having the size smaller than the conventional length of the DRX duration in response to determination to reduce the length of the sleep duration of the C-DRX and transmit UE assistance information including a preferred DRX parameter including the preferred length of the DRX duration to the network 494. When the length of the on-duration period is maintained and the length of the DRX cycle is reduced, the length of the sleep duration may be reduced.

According to various embodiments of the disclosure, the electronic device 400 may transmit UE assistance information including information for increasing the length of the sleep duration to the network 394 in response to determination to increase the length of the sleep duration of the C-DRX on the basis of state information of the electronic device 400.

According to an embodiment, the electronic device 400 may configure the determined preferred time as a value smaller than the conventionally configured time and transmit UE assistance information including the preferred DRX parameter including the changed time to the network 494.

According to an embodiment, the electronic device 400 may configure the preferred length of the DRX duration as a value having the size larger than the conventional length of the DRX duration in response to determination to increase the length of the sleep duration of the C-DRX on the basis of state information of the electronic device 400 and transmit UE assistance information including the preferred DRX parameter including the preferred length of the DRX duration to the network 494. When the length of the on-duration period is maintained and the length of the DRX cycle is increased, the length of the sleep duration may be increased.

According to various embodiments of the disclosure, in operation 730, the electronic device 400 may control a communication circuit (for example, the communication circuit 410 of FIG. 4) on the basis of the changed length of the sleep duration included in an RRC reconfiguration message.

The network 394 may generate C-DRX configuration information on the basis of the predetermined preferred time of the inactivity timer (preferred DRX inactivity timer) and/or the preference length of the DRX cycle (preferred DRXLongCycle) included in the UE assistance information. The C-DRX configuration information may include a predetermined time (corresponding to the inactivity timer) having the same value as the predetermined preferred time and/or the length of the DRX duration having the same value as the preferred length. The network 394 may transmit the RRC reconfiguration message including the C-DRX configuration information to the electronic device 400 as a part of the operation for making the RRC connection again in the state in which the RRC connection between the electronic device 400 and the network 394 is released.

According to various embodiments of the disclosure, the electronic device 400 may control an operation related to the C-DRX of the communication circuit 410 on the basis of C-DRX configuration information included in an RRC reconfiguration message. The electronic device 400 may control the inactivity timer on the basis of a predetermined time included in C-DRX configuration information. The electronic device 400 may switch a reception function of the communication circuit 410 from an activated state to a deactivated state in response to expiration of the changed time. The electronic device 400 may switch the reception function of the communication circuit 410 to the activated state after a time corresponding to the length of the DRX duration passes in the state in which the reception function of the communication circuit 410 is maintained in the deactivated state.

The method of operating the electronic device according to various embodiments of the disclosure may include: an operation of determining whether to change a length of the sleep duration of the C-DRX, based on a state of the electronic device; an operation of transmitting UE assistance information for changing the length of the sleep duration of the C-DRX, based on the determination, to a network, and an operation of controlling a communication circuit configured to perform an operation related to the C-DRX of the communication circuit, based on the inactivity timer having a changed predetermined time included in an RRC reconfiguration message received according to an RRC connection with the network.

The method of operating the electronic device according to various embodiments of the disclosure may further include: an operation of transmitting a first packet to the network in a first on-duration period of the C-DRX; and an operation of transmitting the UE assistance information to the network in response to detection of reception of a first response packet transmitted by the network in a second on-duration period different from the first on-duration period.

The method of operating the electronic device according to various embodiments of the disclosure may further include: an operation of activating a timer for detecting a reception delay of the response packet for a predetermined time in response to detection of reception of the response packet in the second on-duration period; and an operation of transmitting the UE assistance information to the network in response to reception of the response packet transmitted by the network in a third on-duration period different from the second on-duration period before the timer expires.

In the method of operating the electronic device according to various embodiments of the disclosure, the UE assistance information may include information for reducing the length of the sleep duration.

In the method of operating the electronic device according to various embodiments of the disclosure, the information for reducing the length of the sleep duration may include inactivity timer information indicating a time longer than a predetermined time corresponding to the inactivity timer.

The method of operating the electronic device according to various embodiments of the disclosure may further include an operation of transmitting UE assistance information for reducing the length of sleep duration of the C-DRX to the network in response to identification that the electronic device operates in a high-performance mode, based on state information of the electronic device.

The method of operating the electronic device according to various embodiments of the disclosure may further include an operation of transmitting UE assistance information for increasing the length of the sleep duration of the C-DRX to the network in response to identification that the electronic device operates in a power-saving mode, based on state information of the electronic device.

In the method of operating the electronic device according to various embodiments of the disclosure, the UE assistance information may include C-DRX cycle information indicating a length having a value larger than the length of the C-DRX cycle.

The method of operating the electronic device according to various embodiments of the disclosure may further include: an operation of transmitting UE assistance information for reducing the length of the sleep duration of the C-DRX to the network in response to identification that a predetermined application is executed, based on state information of the electronic device.

In the method of operating the electronic device according to various embodiments of the disclosure, the predetermined application may include an application capable of performing a function requiring a low delay time, and the delay time may be a difference between a time at which a packet is transmitted to the network and a time at which a response packet corresponding to the packet is received from the network.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:
1. An electronic device comprising:
 a communication processor configured to support a connected mode discontinuous reception (C-DRX); and
 a communication circuit operably connected to the communication processor, the communication circuit con- figured to switch a first on-duration period to a sleep duration based on a predetermined time of an inactivity timer, wherein the communication processor is further configured to:

determine whether to change a length of the sleep duration of the C-DRX based on a state of the electronic device, control the communication circuit to transmit, to a network, UE assistance information for changing the length of the sleep duration of the C-DRX based on a determination that the length of the sleep duration of the C-DRX is changed, and perform an operation related to the C-DRX of the communication circuit based on the inactivity timer having a changed predetermined time included in a radio resource control (RRC) reconfiguration message received according to an RRC connection with the network.

2. The electronic device of claim 1, wherein the communication processor is further configured to:

transmit a first packet to the network in a first on-duration period of the C-DRX; and control the communication circuit to transmit the UE assistance information to the network in response to detecting a reception of a response packet received from the network in a second on-duration period that is different from the first on-duration period.

3. The electronic device of claim 2, wherein the UE assistance information includes information for reducing the length of the sleep duration.

4. The electronic device of claim 3, wherein the information for reducing the length of the sleep duration includes inactivity timer information indicating a time longer than a predetermined time corresponding to the inactivity timer.

5. The electronic device of claim 1, wherein the communication processor is further configured to:

activate a timer for detecting a reception delay of a response packet for a predetermined time in response to detecting a reception of the response packet in a second on-duration period; and control the communication circuit to transmit the UE assistance information to the network in response to receiving the response packet received from the network in a third on-duration period that is different from the second on-duration period before the timer expires.

6. The electronic device of claim 1, wherein the communication processor is further configured to control, based on state information of the electronic device, the communication circuit to transmit, to the network, UE assistance information for reducing the length of the sleep duration of the C-DRX in response to identifying that the electronic device operates in a high-performance mode.

7. The electronic device of claim 1, wherein the communication processor is further configured to control, based on state information of the electronic device, the communication circuit to transmit, to the network, UE assistance information for increasing the length of the sleep duration of the C-DRX to in response to identifying that the electronic device operates in a power-saving mode.

8. The electronic device of claim 7, wherein the UE assistance information includes C-DRX cycle information indicating length information including a value larger than the length of the C-DRX cycle.

9. The electronic device of claim 1, wherein the communication processor is further configured to control, based on state information of the electronic device, the communication circuit to transmit, to the network, UE assistance information for reducing the length of the sleep duration of the C-DRX in response to identifying that a predetermined application is executed.

10. The electronic device of claim 9, wherein the predetermined application includes an application capable of performing a function requiring a low delay time, and wherein the delay time is determined as a difference time between a time at which a packet is transmitted to the network and a time at which a response packet corresponding to the packet is received from the network.

11. A method of an electronic device supporting a connected mode discontinuout reception (C-DRX), the method comprising:

switching a first on-duration period to a sleep duration based on a predetermined time of an inactivity timer;

determining whether to change a length of the sleep duration of the C-DRX based on a state of the electronic device;

transmitting, to a network, UE assistance information for changing the length of the sleep duration of the C-DRX based on a determination that the length of the sleep duration of the C-DRX is changed; and performing an operation related to the C-DRX based on the inactivity timer comprising a changed predetermined time included in a radio resource control (RRC) reconfiguration message received according to an RRC connection with the network.

12. The method of claim 11, further comprising:

transmitting a first packet to the network in a first on-duration period of the C-DRX; and transmitting the UE assistance information to the network in response to detecting a reception of a response packet received from the network in a second on-duration period that is different from the first on-duration period.

13. The method of claim 12, wherein the UE assistance information includes information for reducing the length of the sleep duration.

14. The method of claim 13, wherein the information for reducing the length of the sleep duration includes inactivity timer information indicating a time longer than a predetermined time corresponding to the inactivity timer.

15. The method of claim 11, further comprising:

activating a timer for detecting a reception delay of a response packet for a predetermined time in response to detecting a reception of the response packet in a second on-duration period; and transmitting the UE assistance information to the network in response to receiving the response packet received from the network in a third on-duration period that is different from the second on-duration period before the timer expires.

* * * * *